(12) United States Patent
Yamamoto

(10) Patent No.: US 10,700,620 B2
(45) Date of Patent: Jun. 30, 2020

(54) VIBRATION WAVE MOTOR AND OPTICAL DEVICE USING VIBRATION WAVE MOTOR

(71) Applicant: CANON KABUSHIKI KAISHA, Tokyo (JP)

(72) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 15/609,466

(22) Filed: May 31, 2017

(65) Prior Publication Data
US 2017/0366105 A1    Dec. 21, 2017

(30) Foreign Application Priority Data

Jun. 17, 2016   (JP) .................................. 2016-120606

(51) Int. Cl.
| | |
|---|---|
| *H01L 41/09* | (2006.01) |
| *H02N 2/00* | (2006.01) |
| *G02B 7/08* | (2006.01) |
| *H02N 2/02* | (2006.01) |

(52) U.S. Cl.
CPC ............... *H02N 2/006* (2013.01); *G02B 7/08* (2013.01); *H02N 2/001* (2013.01); *H02N 2/026* (2013.01)

(58) Field of Classification Search
CPC ........ H02N 2/006; H02N 2/001; H02N 2/026; G02B 7/08

USPC ................. 310/323.21–323.19, 323, 21, 328
See application file for complete search history.

(56) References Cited

U.S. PATENT DOCUMENTS

| | | | |
|---|---|---|---|
| 6,218,767 B1 | 4/2001 | Akada et al. | |
| 9,219,429 B2 | 12/2015 | Yamanaka et al. | |
| 9,660,556 B2 | 5/2017 | Yamamoto | |
| 2016/0065092 A1 | 3/2016 | Yamanaka et al. | |
| 2017/0315324 A1* | 11/2017 | Noguchi | G02B 7/04 |
| 2019/0165697 A1* | 5/2019 | Ninomiya | H02N 2/026 |

FOREIGN PATENT DOCUMENTS

JP        2014-212682 A      11/2014

* cited by examiner

*Primary Examiner* — Thomas M Dougherty
(74) *Attorney, Agent, or Firm* — Venable LLP

(57) ABSTRACT

A vibration wave motor includes a vibrator including a piezoelectric element; a friction member with which the vibrator comes into contact by receiving pressurizing force; and a guide member that holds the vibrator. The guide member includes an input portion on one end portion, the input portion receiving force from outside, and a pressurizing portion on another end portion positioned on an opposite side of the one end portion, the pressurizing portion providing the pressurizing force to the vibrator. A guide portion extending in a direction of relative movement of the vibrator and the friction member is formed between the input portion and the pressurizing portion.

10 Claims, 3 Drawing Sheets

VIBRATION WAVE MOTOR AND OPTICAL DEVICE USING VIBRATION WAVE MOTOR

BACKGROUND OF THE INVENTION

Field of the Invention

The present invention relates to a vibration wave motor and an optical device using the vibration wave motor.

Description of the Related Art

Conventionally, an ultrasonic motor can relatively move a vibrator and a sliding member by applying a high frequency drive voltage to a piezoelectric element to periodically vibrate the vibrator and bringing the vibrator into contact with the sliding member by a pressurizing or pressing force. A linear ultrasonic motor is disclosed in Japanese Patent Application Laid-Open No. 2014-212682, wherein pressurizing force of a spring biases a vibrator toward a contact basic member. Reaction force against the pressurizing force is received by placing rolling members between a movable guide portion of a moving plate attached to a vibrator support member and a cover guide portion of a cover plate.

SUMMARY OF THE INVENTION

However, the rolling members as receiving portions of the reaction force of the vibrator need to be provided in two lines on both sides of the vibrator in a direction of movement in the conventional configuration, and there is a problem that downsizing of the linear ultrasonic motor is difficult.

The present invention provides a vibration wave motor including: a vibrator including a piezoelectric element; a friction member with which the vibrator comes into contact by receiving pressurizing force; and a guide member that holds the vibrator, wherein the guide member includes: an input portion on one end portion, the input portion receiving force from outside; and a pressurizing portion on another end portion positioned on an opposite side of the one end portion, the pressurizing portion providing the pressurizing force to the vibrator, and a first guide portion extending in a direction of relative movement of the vibrator and the friction member is formed between the input portion and the pressurizing portion.

According to the present invention, rolling members as receiving portions of the reaction force of the vibrator need to be arranged only on one side of the vibrator in the direction of the relative movement, and the vibration wave motor can be downsized. In addition, the guide member pressurizes and holds the vibrator. Therefore, the number of members can be reduced, and the vibration wave motor can be downsized.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
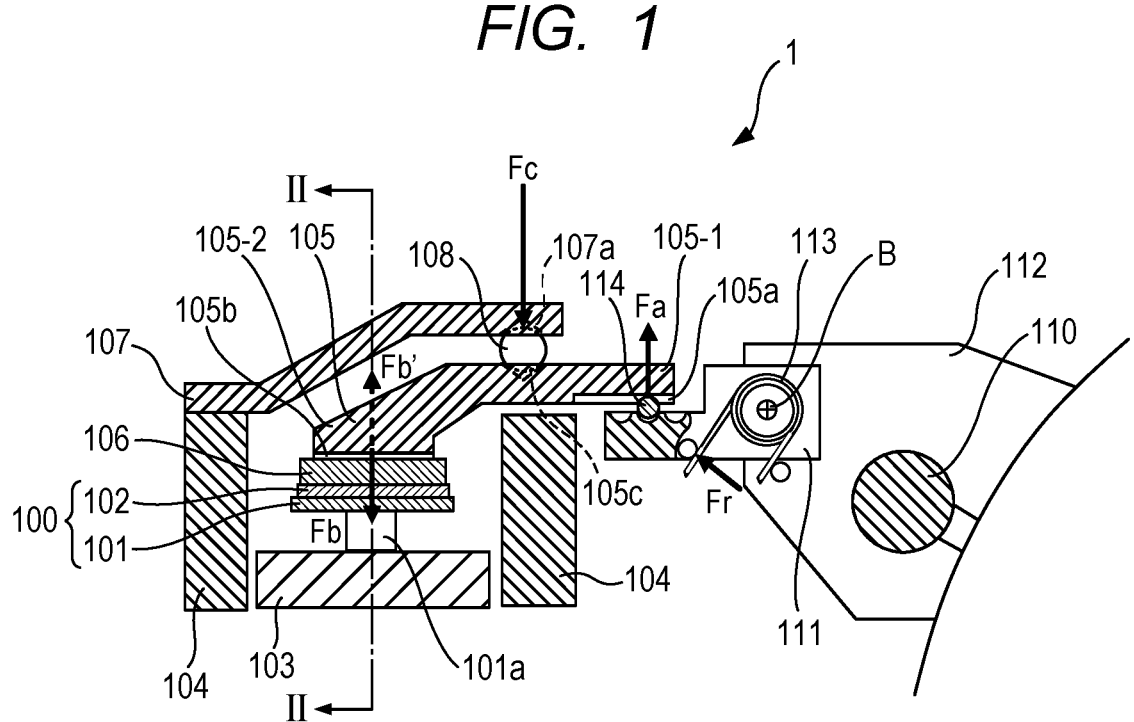
FIG. 1 is a cross-sectional view of main parts of a vibration wave motor 1 illustrating an embodiment of the present invention.
Figure 2:
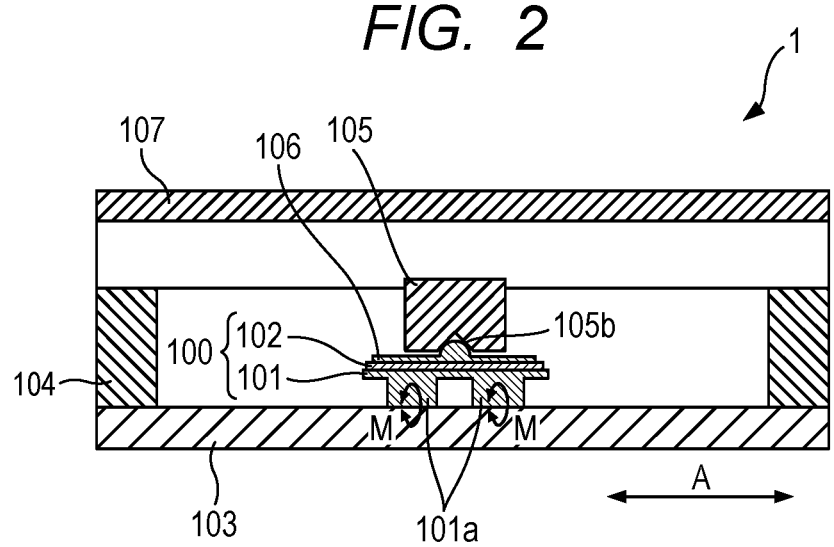
FIG. 2 is a cross-sectional view of the vibration wave motor 1 in FIG. 1 illustrating the embodiment of the present invention.
Figure 3:
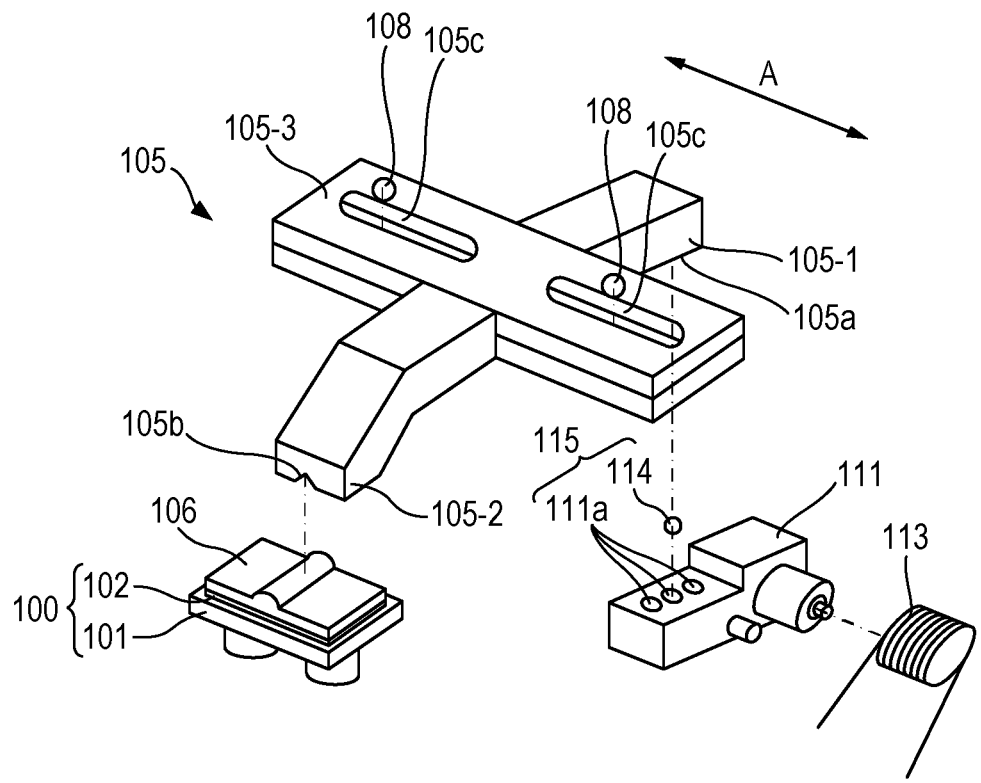
FIG. 3 is an exploded perspective view illustrating a configuration of a pressurizing guide member 105 of the vibration wave motor 1 of the present invention.

FIG. 1 is a cross-sectional view of main parts on a surface orthogonal to a direction A (see FIG. 2) of relative movement of a vibration wave motor 1 (ultrasonic motor) illustrating an embodiment of the present invention. FIG. 2 is a cross-sectional view on a cross-sectional line II-II of FIG. 1 and is a cross-sectional view in the direction A of the relative movement. FIG. 3 is an exploded perspective view illustrating a configuration of members engaged with a pressurizing guide member 105. Although an example of a linear vibration wave motor 1 will be described, the present embodiment can also be applied to a rotary type and other types.

A well-known adhesive or the like is used to fix a piezoelectric element 102 to a vibration plate 101. When a high frequency drive voltage is applied to the piezoelectric element 102, vibration at a frequency in an ultrasonic region is generated, and the vibration plate 101 resonates in a longitudinal direction and a lateral direction. The vibration plate 101 and the piezoelectric element 102 form a vibrator 100.

When the vibration at the frequency in the ultrasonic region is generated in the piezoelectric element 102, a pressure contact portion 101a formed on the vibration plate 101 makes an elliptical motion M as illustrated in FIG. 2. The frequency or the phase of the high frequency drive voltage applied to the piezoelectric element 102 can be changed to appropriately change the rotation direction or the ellipticity of the elliptical motion M to generate a desirable motion. The pressure contact portion 101a of the vibration plate 101 can be brought into contact by pressure to a friction member 103 as a counterpart component to thereby generate driving force for relatively moving the vibrator 100 and the friction member 103. The optical axis direction (orthogonal direction in FIG. 1, left and right direction in FIG. 2) can be set as the direction A of the relative movement to drive the vibrator 100. A well-known fastening unit, such as a screw, is used to fix the friction member 103 to a housing 104.

As described later, the pressurizing guide member 105 includes: an input portion 105a on one end portion 105-1, the input portion 105a receiving force (biasing force Fa) from the outside; and a pressurizing portion 105b on another end portion 105-2 positioned on the opposite side of the one end portion 105-1 (see FIG. 3), the pressurizing portion 105b pressurizing a pressuring plate 106. The pressurizing guide member 105 also has a function of using pressurizing force Fb for pressurizing the pressuring plate 106 to hold the vibrator 100. A plurality of first guide portions 105c extending in the direction A of the relative movement of the vibrator 100 is formed substantially in a line between the input portion 105a and the pressurizing portion 105b.

Well-known screws or the like are used to fix a cover member 107 to the housing 104. Two second guide portions 107a are formed on the cover member 107, at positions opposing the two first guide portions 105c. Rolling members 108 are inserted between the first guide portions 105c and the corresponding second guide portions 107a, and the rolling members 108 are clamped by clamping force Fc (described later).

A lens holding member 112 holds an imaging lens (not illustrated), and a guide bar 110 holds the lens holding member 112 in the optical axis direction (orthogonal direction to the paper in FIG. 1, left and right direction in FIG. 2) in a manner that the lens holding member 112 can freely slide. A rack 111 is held in a manner that the rack 111 can rotate relative to the lens holding member 112, with a central axis B (orthogonal direction to the paper in FIG. 1, left and right direction in FIG. 2) as a rotation center. Rotational biasing force of a torsion spring 113 provides the rack 111 with rotation force Fr in the clockwise direction. The input portion 105a provided on the one end portion 105-1 of the pressurizing guide member 105 receives the rotation force Fr as force (biasing force Fa) from the outside through an engagement sphere 114.

In the described configuration, the vibrator 100, the friction member 103, the housing 104, the pressurizing guide member 105, the pressuring plate 106, the cover member 107 and the rolling members 108 form the vibration wave motor 1.

Next, a pressurizing method of the vibrator 100 and a guide mechanism in the relative movement of the pressurizing guide member 105 according to the embodiment of the present embodiment will be described in detail. As described in the outline, the torsion spring 113 provides the rack 111 attached to the lens holding member 112 with the rotation force Fr in the clockwise direction as illustrated in FIG. 1. The rotation force Fr acts as the biasing force Fa for biasing the input portion 105a provided on the one end portion 105-1 of the pressurizing guide member 105 upward in FIG. 1 through the engagement sphere 114 in the inserted state.

The pressurizing method of the vibrator 100 will be described first. When the biasing force Fa acts on the input portion 105a provided on the one end portion 105-1 of the pressurizing guide member 105, force for rotation in the counterclockwise direction about spherical centers of the rolling members 108 is generated in the pressurizing guide member 105. Cooperation of the first guide portions 105c, the rolling members 108 and the second guide portions 107a that are fixed ends causes the biasing force Fa to act as the pressurizing force Fb on the pressurizing portion 105b provided on the other end portion 105-2 positioned on the opposite side of the one end portion 105-1. The pressurizing force Fb pressurizes the vibrator 100 against the friction member 103 through the pressuring plate 106 and brings the vibrator 100 and the friction member 103 into frictional contact. The direction of the pressurizing force Fb can follow a direction in which the vibrator 100 is perpendicular to the sliding surface of the friction member 103.

When the vibrator 100 is pressurized by the pressurizing force Fb, the biasing force Fa of the input portion 105a and reaction force Fb' of the pressurizing force Fb act on the first guide portions 105c, and the force is transmitted to the second guide portions 107a through the rolling members 108. The clamping force Fc that is force against the force transmitted to the second guide portions 107a acts on the rolling members 108, and as a result, the rolling members 108 are clamped between the first guide portions 105c and the second guide portions 107a. The clamping force Fc holds the rolling members 108 between the first guide portions 105c and the second guide portions 107a without looseness, in a manner that the rolling members 108 can roll in the direction A of the relative movement.

As described, the pressurizing guide member 105 provides the pressurizing force Fb to the vibrator 100 of the vibration wave motor 1 of the present invention, and at the same time, the pressurizing guide member 105 holds the vibrator 100. In a conventional configuration, a support member that supports a vibrator, a spring member that pressurizes the vibrator, a spring holding member that holds the spring member and the like need to be provided as separate members. However, one member, i.e. the pressurizing guide member 105, pressurizes and holds the vibrator 100 in the embodiment of the present invention. The configuration allows reducing the number of members and downsizing the apparatus.

Well-known screws or the like are used to fix the friction member 103 to the housing 104, and well-known screws or the like are also used to fix the cover member 107 including the second guide portions 107a to the housing 104. A well-known unit, such as a screw, is used to fix the vibration wave motor 1 to a barrel (not illustrated) that holds the lens holding member 112.

With the configuration, a high frequency drive voltage is applied to the piezoelectric element 102 to generate vibration at a frequency in the ultrasonic region to generate the elliptical motion M on the pressure contact portion 101a formed on the vibration plate 101 as illustrated in FIG. 2. The vibrator 100 in frictional contact with the friction member 103 can advance and retreat in the direction A of the relative movement, and the lens holding member 112 connected to the pressurizing guide member 105 and the rack 111 can also advance and retreat in the optical axis direction together with the vibrator 100.

Next, the guide mechanism in the relative movement of the pressurizing guide member 105 will be described. The first guide portions 105c included in the pressurizing guide member 105 are V-shaped in cross section as illustrated in FIG. 1 and are grooves extending in the direction A of the relative movement as illustrated in FIG. 3. The rolling members 108 are inserted into the first guide portions 105c in a manner that the rolling members 108 can freely roll in the direction A of the relative movement. Like the first guide portions 105c, the second guide portions 107a V-shaped in cross section and extending in the direction A of the relative movement are formed on the cover member 107. Like the first guide portions 105c, the rolling members 108 are inserted into the second guide portions 107a in a manner that the rolling members 108 can roll in the direction A of the relative movement.

FIG. 3 is an exploded perspective view illustrating a configuration of members engaged with the pressurizing guide member 105 of the vibration wave motor 1 of the present invention. The pressurizing guide member 105 includes the first guide portions 105c at two locations substantially in a line on an extended portion 105-3 extending in the direction A of the relative movement. The one end portion 105-1 and the other end portion 105-2 extend from the extended portion 105-3 of the pressurizing guide member 105 in a direction substantially orthogonal to the direction A of the relative movement. Therefore, the one end portion 105-1 and the other end portion 105-2 that are parts for pressurizing and holding the vibrator 100 and the extended portion 105-3 including the first guide portions 105c that are parts for guiding the vibrator 100 in the direction A of the relative movement are arranged in a substantially cross shape in plan view.

The two first guide portions 105c sandwich the one end portion 105-1 including the input portion 105a and the other end portion 105-2 including the pressurizing portion 105b. According to the configuration, the pressurizing guide member 105 serves as a guide mechanism that guides the vibrator 100 held by pressurizing, in a manner that the vibrator 100 can linearly advance and retreat in the optical axis direction.

As illustrated in FIG. 3, a plurality of sphere receiving portions 111a that allows fitting the engagement sphere 114 is formed on the rack 111 in a direction substantially orthogonal to the direction A of the relative movement. Providing the plurality of sphere receiving portions 111a allows changing the position of the engagement sphere 114 fitted into the sphere receiving portion 111a. The engagement sphere 114 and the sphere receiving portions 111a form an input position variable unit 115. As illustrated in FIG. 1, the input portion 105a includes grooves that are V-shaped in cross section, in the direction substantially orthogonal to the direction A of the relative movement. This allows the input portion 105a to correspond to the position of the engagement sphere 114 changed by the input position variable unit 115. Therefore, the input position variable unit 115 can change the position of the engagement sphere 114 to change the magnitude of the force (biasing force Fa) from the outside received by the input portion 105a of the pressurizing guide member 105 to thereby adjust the pressurizing force Fb for pressurizing the vibrator 100.

When the vibration wave motor 1 of the present invention is incorporated into a different optical device, the force of the torsion spring 113 and the like may be set in advance. However, the input position variable unit 115 can change the position of the engagement sphere 114 engaged with the sphere receiving portion 111a, and the pressurizing force Fb can be adjusted. Therefore, the input position variable unit 115 can adjust the pressurizing force Fb without replacing the members, and the compatibility with a different optical device can be increased in the vibration wave motor 1.

According to the vibration wave motor 1 of the present invention, the rolling members 108 as receiving portions of the reaction force Fb' of the vibrator 100 are arranged substantially in a line in the direction A of the relative movement, only on one side of the vibrator 100. The configuration eliminates the need to have a space for providing the rolling members 108 in two lines on both sides of the vibrator 100 in the direction A of the relative movement (conventional configuration), and the apparatus can be downsized.

Figure 4:
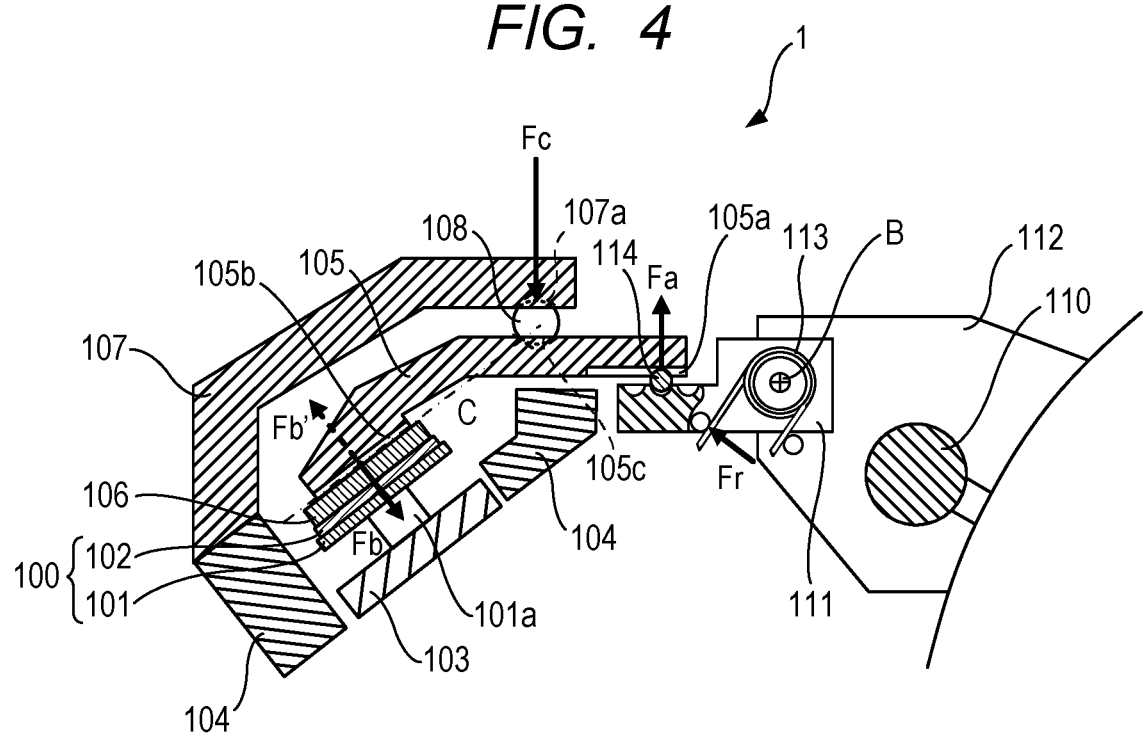
FIG. 4 is a cross-sectional view of main parts of the vibration wave motor 1 illustrating a modification of the embodiment of the present invention.

As illustrated in a modification in FIG. 4, the friction member 103 can be tilted and arranged such that the direction of the pressurizing force Fb is perpendicular to a straight line indicated by an alternate long and short dash line C connecting the first guide portion 105c and the pressurizing portion 105b. In this way, the vibrator 100 perpendicularly abuts the sliding surface of the friction member 103. The driving force can be effectively generated, and the apparatus can be further downsized.

Application Example

Figure 5:
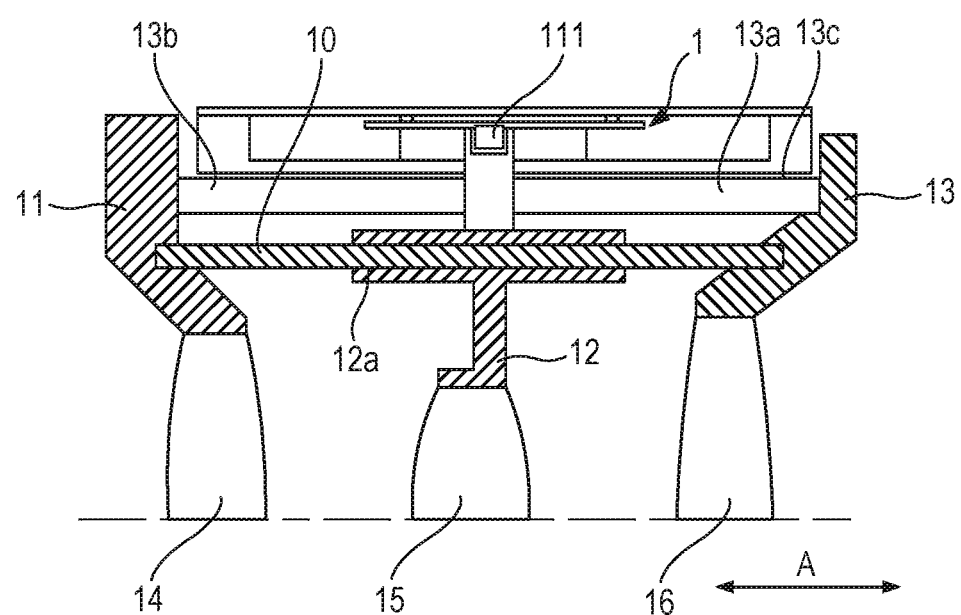
FIG. 5 is a cross-sectional view of main parts illustrating an application example in which the vibration wave motor 1 of the present invention is incorporated into a barrel portion of an optical device.

FIG. 5 is a cross-sectional view of main parts illustrating an application example in which the vibration wave motor 1 of the present invention is incorporated into, for example, a barrel portion of an optical device. The same constituent members as in the embodiment are provided with the same reference signs.

A first lens holding member 11 holds a first lens 14, and a third lens holding member 13 holds a third lens 16. A peripheral portion of the third lens holding member 13 includes a cylindrical portion 13a, and screws or the like (not illustrated) are used to fasten the cylindrical portion 13a to the first lens holding member 11 at an end portion 13b of the cylindrical portion 13a. A unit receiving portion 13c for fixing the vibration wave motor 1 is provided on part of an outer diameter portion of the cylindrical portion 13a, and well-known screws or the like are used to removably fix the vibration wave motor 1. A second lens holding member 12 that holds a second lens 15 is arranged on an inner diameter portion of the cylindrical portion 13a.

The second lens 15 serves as a focusing lens, and the vibration wave motor 1 of the present invention moves the second lens 15 in the direction A (optical axis direction) of the relative movement. In this case, the lens holding member 12 is fitted to a well-known guide bar 10 through a bearing portion 12a, in a manner that the lens holding member 12 can slide relative to the guide bar 10. This allows the second lens 15 to move in the optical axis direction. The second lens holding member 12 is connected to the input portion 105a (not illustrated) of the pressurizing guide member 105 through the rack 111.

As described, the configuration of providing the rolling members 108 as receiving portions of the reaction force Fb' of the vibrator 100 in two lines on both sides of the vibrator 100 in the direction A of the relative movement as in the conventional configuration is not necessary in the present invention, and the apparatus can be downsized. Although the application example of the barrel portion of the optical device provided with the vibration wave motor 1 according to the present invention is described in detail, the present invention is not limited to the application example, and the present invention can be in any form within the scope of the claims.

Downsizing of the vibration wave motor incorporated into the optical device or the like is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120606, filed Jun. 17, 2016, which is hereby incorporated by reference herein in its entirety.

What is claimed is:

1. A vibration wave motor comprising:
   a vibrator comprising a piezoelectric element;
   a friction member with which the vibrator comes into contact by receivinga pressurizing force; and
   a guide member that guides the vibrator in a direction of movement relative to the friction member, wherein
   the guide member comprises:
   an input portion on one end portion, the input portion receiving force from outside;
   a pressurizing portion on another end portion positioned on an opposite side of the one end portion, the pressurizing portion providing the pressurizing force to the vibrator; and
   a first guide portion extending in the direction of the relative movement and being formed between the input portion and the pressurizing portion.
2. The vibration wave motor according to claim 1, wherein part of the guide member for pressurizing and holding the vibrator and part of the guide member for guiding the vibrator in the direction of the relative movement are arranged in a substantially cross shape.

3. The vibrator wave motor according to claim 1, further comprising
a cover member, wherein
a second guide portion positioned opposite to the first guide portion is formed on the cover member, and cooperation of the first guide portion and the second guide portion causes the pressurizing force to act according to the force from the outside.

4. The vibration wave motor according to claim 1, wherein
the friction member is fixed to a housing of the vibration wave motor.

5. The vibration wave motor according to claim 3, wherein
rolling members are clamped between the first guide portion and the second guide portion.

6. The vibration wave motor according to claim 5, wherein
the rolling members are provided at two locations in the direction of the relative movement.

7. The vibration wave motor according to claim 1, wherein
the pressurizing force can be changed by changing a position of the input portion that receives the force from the outside.

8. The vibration wave motor according to claim 1, wherein
the direction of the pressurizing force is perpendicular to a straight line connecting the first guide portion and the pressurizing portion such that the vibrator is perpendicular to a sliding surface of the friction member.

9. The vibration wave motor according to claim 1, wherein
the vibration wave motor is an ultrasonic motor that generates vibration at a frequency in an ultrasonic region.

10. An optical device using a vibration wave motor, the vibration wave motor comprising:
a vibrator comprising a piezoelectric element;
a friction member with which the vibrator comes into contact by receiving a pressurizing force; and
a guide member that guides the vibrator in a direction of movement relative to the friction member, wherein
the guide member comprises: an input portion on one end portion, the input portion receiving force from outside; a pressurizing portion on another end portion positioned on an opposite side of the one end portion, the pressurizing portion providing the pressurizing force to the vibrator; and
a guide portion extending in the direction of the relative movement and being formed between the input portion and the pressurizing portion.

* * * * *